US010586134B2

(12) United States Patent
Ohta et al.

(10) Patent No.: US 10,586,134 B2
(45) Date of Patent: Mar. 10, 2020

(54) CARD ISSUING DEVICE

(71) Applicant: NIDEC SANKYO CORPORATION, Suwa-gun Nagano (JP)

(72) Inventors: Keiji Ohta, Suwa-gun Nagano (JP); Ryo Uchiyama, Suwa-gun Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 16/026,118

(22) Filed: Jul. 3, 2018

(65) Prior Publication Data

US 2019/0012583 A1    Jan. 10, 2019

(30) Foreign Application Priority Data

Jul. 4, 2017   (JP) ................................. 2017-130987

(51) Int. Cl.
*G06K 13/06*    (2006.01)
(52) U.S. Cl.
CPC .................... *G06K 13/06* (2013.01)
(58) Field of Classification Search
None
See application file for complete search history.

(56) References Cited

U.S. PATENT DOCUMENTS

| | | | | | |
|---|---|---|---|---|---|
| 5,773,805 | A | * | 6/1998 | Nakamura | ............. G06K 13/08 235/440 |
| 7,387,257 | B2 | * | 6/2008 | Suzuki | ................... G06K 1/121 235/486 |
| 8,167,211 | B2 | * | 5/2012 | Tatai | .................... G06K 13/103 235/486 |

FOREIGN PATENT DOCUMENTS

CN          204759457 U     11/2015

* cited by examiner

*Primary Examiner* — Kristy A Haupt
(74) *Attorney, Agent, or Firm* — Cantor Colburn LLP (57) ABSTRACT

A card issuing device may include a plurality of card feeding mechanisms, each including a card accommodating unit; and a card transmitting mechanism; and a card processing mechanism. The plurality of card feeding mechanisms are aligned in the front-and-back direction. The card processing mechanism is positioned in front of a card feeding mechanism positioned farthest to the front. The card transmitting mechanism is structured to transmit the card toward the front. A first card feeding mechanism may include a card conveying path. The card conveying path is positioned below the card at the bottom accommodated in the card accommodating unit of the first card feeding mechanism. The card conveying path may include a card conveying mechanism configured to convey the card through the card conveying path.

22 Claims, 11 Drawing Sheets

CARD ISSUING DEVICE

CROSS REFERENCE TO RELATED APPLICATION

The present application claims priority under 35 U.S.C. § 119 to Japanese Application No. 2017-130987 filed Jul. 4, 2017, the entire content of which is incorporated herein by reference.

FIELD OF THE INVENTION

The present invention relates to a card issuing device for issuing a card.

DESCRIPTION OF THE RELATED DOCUMENTS

Conventionally, a card issuing device for issuing a card (c.f., Specification of Chinese Examined Utility Model Application Publication No. 04759457, for example) has been known. The card issuing device disclosed in Specification of Chinese Examined Utility Model Application Publication No. 04759457 includes: two card cartridges in which multiple cards are stacked and accommodated; a main body part to which the two card cartridges are attached in a detachable manner; a card transmitting mechanism configured to transmit a card from the card cartridges; and a card reader configured to process the card transmitted from the card cartridges. The two card cartridges are attached to the main body part such that the two card cartridges are aligned in the front-and-back direction of the card issuing device. The card reader is arranged in front of the card cartridge positioned in the front.

In the card issuing device disclosed in Specification of Chinese Examined Utility Model Application Publication No. 04759457, the card transmitting mechanism is positioned below a card cartridge and configured to transmit the card positioned at the very bottom of multiple cards accommodated in the card cartridge toward the card reader. Furthermore, in the card issuing device, cards inside the card cartridge positioned in the front and cards inside the card cartridge positioned in the back are transmitted by the same card transmitting mechanism. Therefore, in the card issuing device, it is possible to lift and drop the card cartridges relative to the main body part. Further, the card issuing device includes a lifting-and-dropping mechanism configured to lift and drop the card cartridges. Furthermore, when a card is transmitted from the card cartridge positioned in the back toward the card reader, the card cartridge in the front is lifted.

The card issuing device disclosed in Specification of Chinese Examined Utility Model Application Publication No. 04759457 includes a lifting-and-dropping mechanism configured to lift and drop a card cartridge in order to transmit a card from the card cartridge positioned in the back. Generally, the configuration of such a lifting-and-dropping mechanism as above is large-scale because a card cartridge in which multiple cards are stacked and accommodated is heavy. Therefore, in a case of the card issuing device disclosed in Specification of Chinese Examined Utility Model Application Publication No. 04759457, there is a risk that the device is large-scaled.

In view of the above situation, at least an embodiment of the present invention is to provide a card issuing device that may be downsized while being provided with multiple card feeding mechanisms aligned in the front-and-back direction, each of which includes a card accommodating unit in which multiple cards are stacked and accommodated.

SUMMARY

To solve the above described problem, the card issuing device according to an embodiment of the present invention includes a plurality of card feeding mechanisms, each of which includes a card accommodating unit in which a plurality of cards including the card are stacked and accommodated and a card transmitting mechanism configured to transmit the card, which is positioned at the bottom of the plurality of cards accommodated in the card accommodating unit, to the outside of the card accommodating unit; and a card processing mechanism configured to process the card fed by one of the plurality of the card feeding mechanisms. Further, in a case where a direction in which the card is issued from the card issuing device is forward in a front-and-back direction and the opposite direction is backward in the front-and-back direction, the plurality of card feeding mechanisms are aligned in the front-and-back direction. Further, the card processing mechanism is positioned in front of a card feeding mechanism positioned in the farthest front among the plurality of card feeding mechanisms. Further, the card transmitting mechanism transmits the card toward the front. Further, in a case where each card feeding mechanism except for a card feeding mechanism positioned in the farthest back among the plurality of card feeding mechanisms is a first card feeding mechanism, a first card feeding mechanism includes a card conveying path for conveying the card transmitted from a card feeding mechanism positioned behind the first card feeding mechanism. Further, the card conveying path is positioned below the card at the bottom accommodated in the card accommodating unit of the first card feeding mechanism. Further, the card conveying path includes a card conveying mechanism configured to convey the card through the card conveying path.

In the card issuing device according to the embodiment of the present invention, multiple card feeding mechanisms respectively include card transmitting mechanisms configured to transmit a card to the outside of a card accommodating unit. Furthermore, in the embodiment of the present invention, a first card feeding mechanism, i.e., each card feeding mechanism except for the card feeding mechanism positioned in the farthest back among the multiple card feeding mechanisms, includes a card conveying path through which the card transmitted from the card feeding mechanism positioned behind the first card feeding mechanism is conveyed. Moreover, in the embodiment of the present invention, for a card conveying path, a card conveying mechanism configured to convey a card through the card conveying path is provided. Therefore, in the embodiment of the present invention, there is no need for preparing such a large-scale mechanism for lifting and dropping a card cartridge as the card issuing device disclosed in Specification of Chinese Examined Utility Model Application Publication No. 04759457. Hence, in the embodiment of the present invention, it is possible to downsize the card issuing device.

Note that, as a single card is conveyed through a card conveying path, the card conveying mechanism provided for the card conveying path cannot be a large-scale mechanism. Therefore, it is possible to downsize the card issuing device even though a card conveying mechanism is provided for a card conveying path. Furthermore, unlike the card issuing device disclosed in Specification of Chinese Examined Utility Model Application Publication No. 04759457, there is no need for lifting and dropping a card cartridge in the present embodiment. Therefore, for example, such a problem that a lifted card cartridge is not dropped to a predetermined position does not occur.

In the embodiment of the present invention, it is preferable that: the card accommodating unit includes a gate through which the card is transmitted by the card transmitting mechanism; and the gate of a card feeding mechanism positioned behind an adjacent card feeding mechanism in the front-and-back direction is positioned below the gate of the adjacent card feeding mechanism positioned in the front. With such a configuration as described above, it is possible to transmit a card from the card accommodating unit of the card feeding mechanism positioned behind toward the card conveying path of the first card feeding mechanism positioned in the front, without deforming the card transmitted from the card accommodating unit of the card feeding mechanism positioned behind or without greatly deforming the card transmitted from the card accommodating unit of the card feeding mechanism positioned behind. Therefore, it is possible to prevent an issued card from being deformed.

In the embodiment of the present invention, it is preferable that: the card transmitting mechanism of the first card feeding mechanism includes a transmitting claw configured to engage with the card to transmit the card, an annular chain to which the transmitting claw is fixed, and two sprockets around which the chain is installed; and the transmitting claw is able to move to a stand-by position, at which the transmitting claw is positioned below the card conveying path. With such a configuration as described above, even though the distance between the card at the very bottom accommodated in the card accommodating unit of the first card feeding mechanism and the card conveying path in the up-and-down direction is narrowed, it is possible to prevent the card, which is conveyed through the card conveying path, and the transmitting claw from interfering each other. Therefore, it is possible to downsize the first card feeding mechanism in the up-and-down direction. As a result, it is possible to downsize the card issuing device in the up-and-down direction.

In the embodiment of the present invention, for example, the transmitting claw includes a card engaging part that engages with a rear edge of the card. Further, when the transmitting claw moves forward between the two sprockets, at least the card engaging part travels above the card conveying path. Further, when the transmitting claw moves backward between the two sprockets, the card engaging unit travels below the card conveying path. Further, when the card is conveyed through the card conveying path, the transmitting claw is positioned at the stand-by position.

In the embodiment of the present invention, it is preferable that: in a case where the card feeding mechanism positioned at the farthest back among the plurality of card feeding mechanisms is a second card feeding mechanism, the card transmitting mechanism of the second card feeding mechanism includes a second transmitting claw configured to engage with the card to transmit the card, an annular belt to which the second transmitting claw is fixed, and two pulleys around which the belt is installed. With such a configuration as described above, it is possible to reduce the cost for the card transmitting mechanism of the second card feeding mechanism, compared to a case where the card transmitting mechanism of the second card feeding mechanism includes a chain and sprockets instead of a belt and pulleys.

In the embodiment of the present invention, for example, the card accommodating unit includes a card cartridge in which the plurality of cards are stacked and accommodated and an accommodating unit main body to which the card cartridge is removably attached.

In the embodiment of the present invention, it is preferable that: a plate spring is positioned at a front edge upper surface of the card conveying path, so as to guide the card toward the front to either one of the card conveying path of the first card feeding mechanism and the card processing mechanism; and a front edge portion of a bottom surface of the card cartridge is in contact with a top surface of the plate spring. With such a configuration as described above, as it is possible to dispose a thin plate spring at the front edge upper surface of the card conveying path, it is possible to narrow the distance between the card cartridge and the card conveying path in the up-and-down direction, compared to a case where, for example, a guide made of a resin material is disposed at the front edge upper surface of the card conveying path. Therefore, it is possible to downsize the first card feeding mechanism in the up-and-down direction.

Furthermore, in a case where, for example, a guide made of a resin material is disposed at the front edge upper surface of the card conveying path and the dimensional precision of the guide is low, there may be such a problem that the bottom surface of the card cartridge comes into contact with the top surface of the guide and it is not possible to set the card cartridge to a predetermined position. Contrarily, in a case where the plate spring to guide a card is disposed at the front edge upper surface of the card conveying path and the front edge portion of the bottom surface of the card cartridge is in contact with the plate spring, it is possible to deform the plate spring, with which the bottom surface of the card cartridge is in contact, so as to enable the card cartridge to be surely set to a predetermined position.

As described above, according to an embodiment of the present invention, it is possible to downsize a card issuing device provided with multiple card feeding mechanisms aligned in the front-and-back direction, each of which includes a card accommodating unit in which multiple cards are stacked and accommodated.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

The following description explains an embodiment of the present invention, with reference to the drawings.

(The Overall Configuration of the Card Issuing Device)

Figure 1:
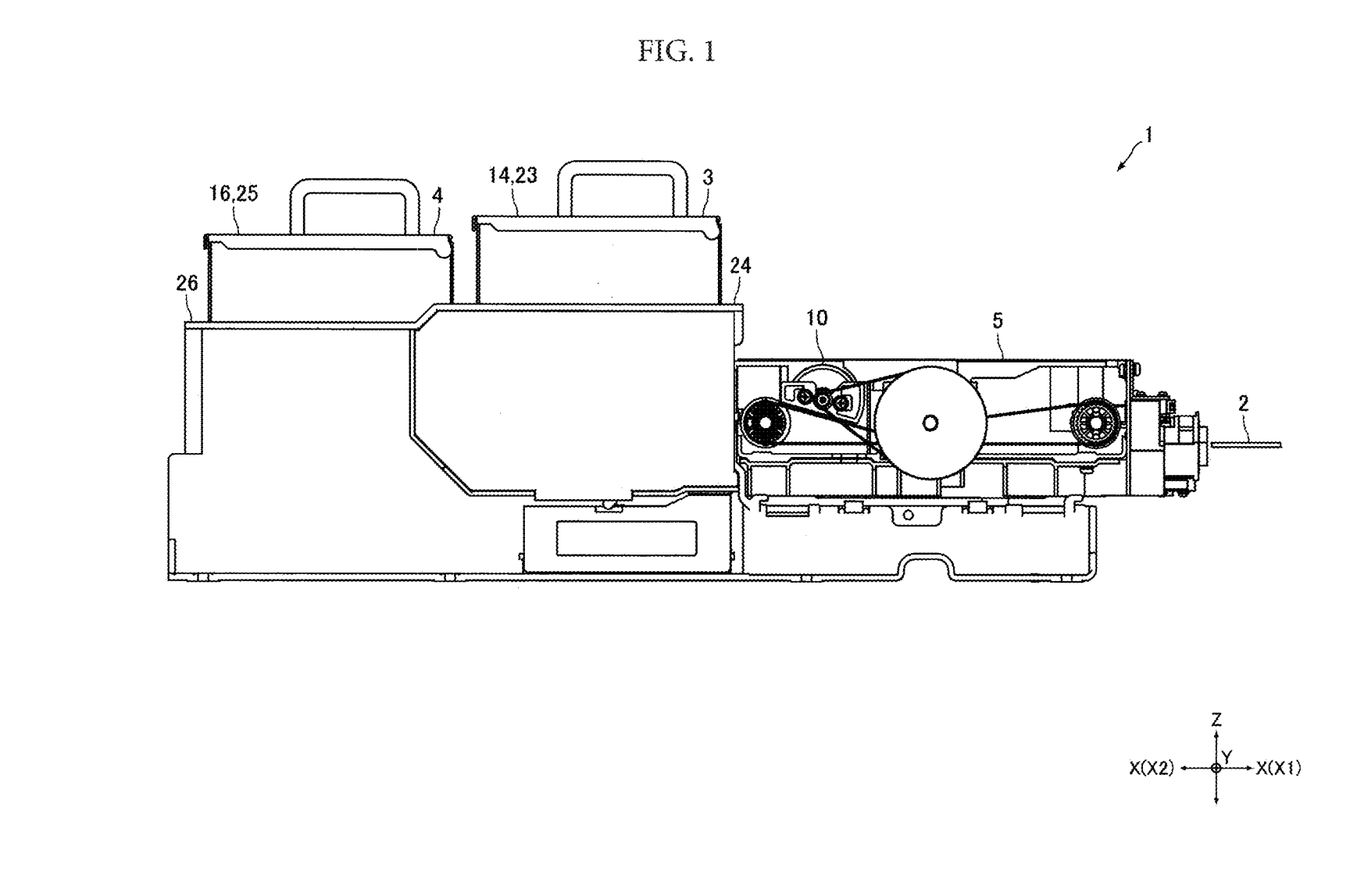
FIG. 1 is a side view of a card issuing device according to an embodiment of the present invention.

FIG. 1 is a side view of the card issuing device 1 according to an embodiment of the present invention.

The card issuing device 1 in the present embodiment is a device for issuing, one at a time, cards 2 stacked and accommodated. The card issuing device 1 includes: multiple card feeding mechanisms 3 and 4; and a card reader 5 as a card processing mechanism configured to process a card 2 fed by the card feeding mechanisms 3 and 4. A card 2 is, for example, a card made of a vinyl chloride material and formed in a rectangular shape with thickness of 0.7 mm or more and 0.8 mm or less. In the card 2, a magnetic stripe for recording magnetic data is formed, for example. Furthermore, the card 2 includes a built-in integrated circuit (IC) tip, for example. Note that the card 2 may be a card made of a polyethylene terephthalate (PET) material with thickness of 0.18 mm or more and 0.36 mm or less, a card made of a paper material with predetermined thickness, etc.

In the following explanation, the direction (i.e., X1 direction in FIG. 1, etc.) in which a card 2 is issued from the card issuing device 1 is the "anterior" direction and the opposite direction (i.e., X2 direction in FIG. 1, etc.) is the "posterior" direction. Furthermore, the direction (i.e., Y direction in FIG. 1, etc.) at right angle to the front-and-back direction (i.e., X direction in FIG. 1, etc.) and the up-and-down direction (i.e., the vertical direction or Z direction in FIG. 1, etc.) is the right-and-left direction. In the present embodiment, the up-and-down direction corresponds to the thickness direction of cards 2 accommodated in the below-described card accommodating units 14 and 16. Further, the right-and-left direction corresponds to the width direction (i.e., the lateral direction) of cards 2 accommodated in the card accommodating units 14 and 16. Further, the front-and-back direction corresponds to the length direction (i.e., the longitudinal direction) of cards 2 accommodated in the card accommodating units 14 and 16.

The card issuing device 1 in the present embodiment includes two card feeding mechanisms 3 and 4. The two card feeding mechanisms 3 and 4 are aligned in the front-and-back direction. Specifically, the card feeding mechanism 3 is positioned in the front and the card feeding mechanism 4 is positioned in the back. The card feeding mechanism 3 in the present embodiment is a first card feeding mechanism, which is a card feeding mechanism other than the card feeding mechanism 4, which is positioned in the farthest back of the multiple card feeding mechanisms 3 and 4. Furthermore, the card feeding mechanism 4 is a second card feeding mechanism, which is the card feeding mechanism positioned in the farthest back of the multiple card feeding mechanisms 3 and 4. Detail configurations of the card feeding mechanisms 3 and 4 are described below.

The card reader 5 is positioned in the front of the card feeding mechanism 3. The card reader 5 includes, for example, an IC contact block and a magnetic head for recording data on a card 2 and for reading data recorded on a card 2. Inside the card reader 5, there is formed a card conveying path through which a card 2 is conveyed. Further, the card conveying path is provided with a pad roller 9 (c.f., FIG. 2) and a drive roller 8 (c.f., FIG. 2) for conveying a card 2. The driving roller is connected to a motor 10. The pad roller 9 is positioned to face the drive roller 8 and is biased toward the drive roller 8.

(The Configuration of the Card Feeding Mechanisms)

Figure 2:
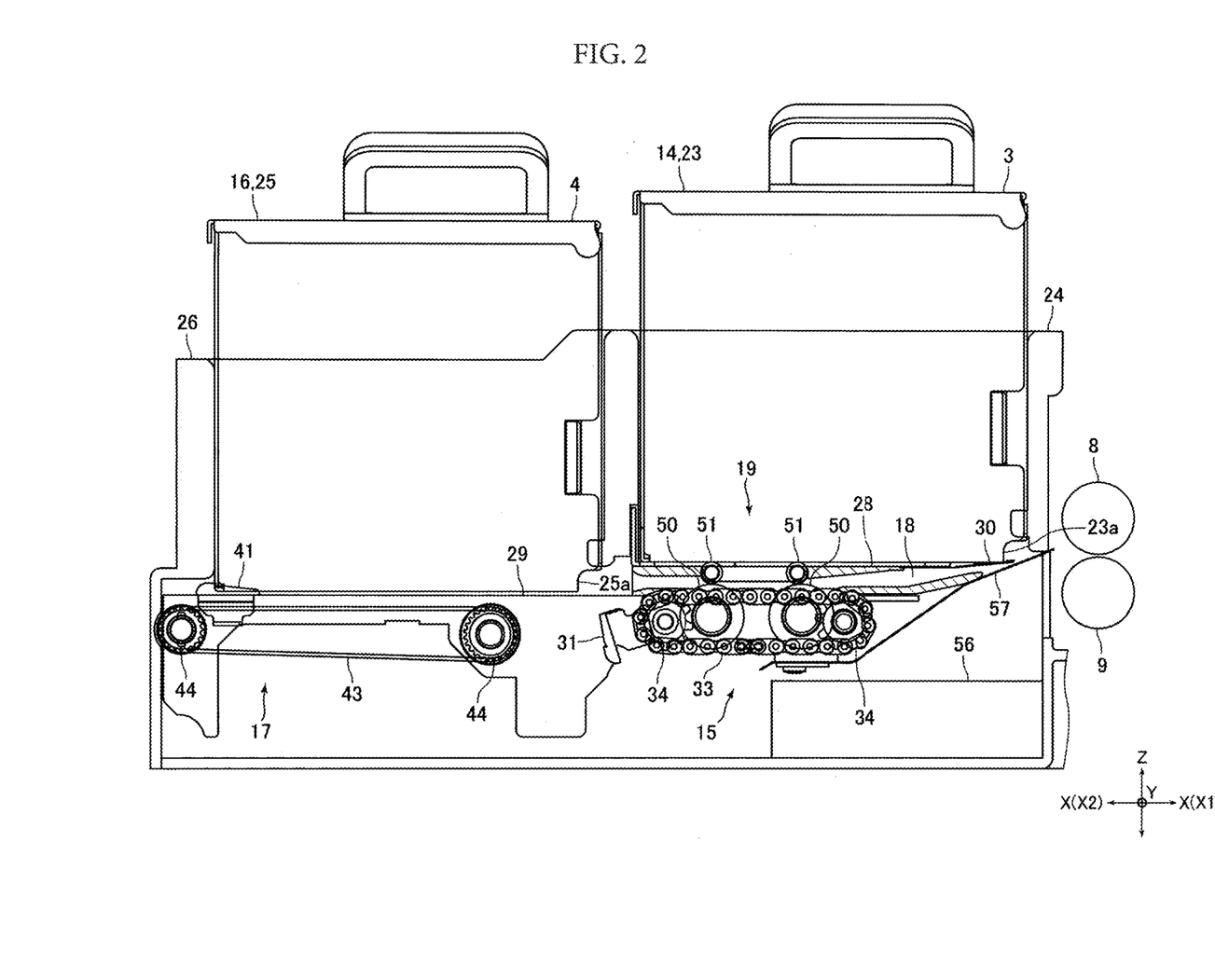
FIG. 2 is a side view for explaining the configuration of card feeding mechanisms illustrated in FIG. 1.
Figure 3:
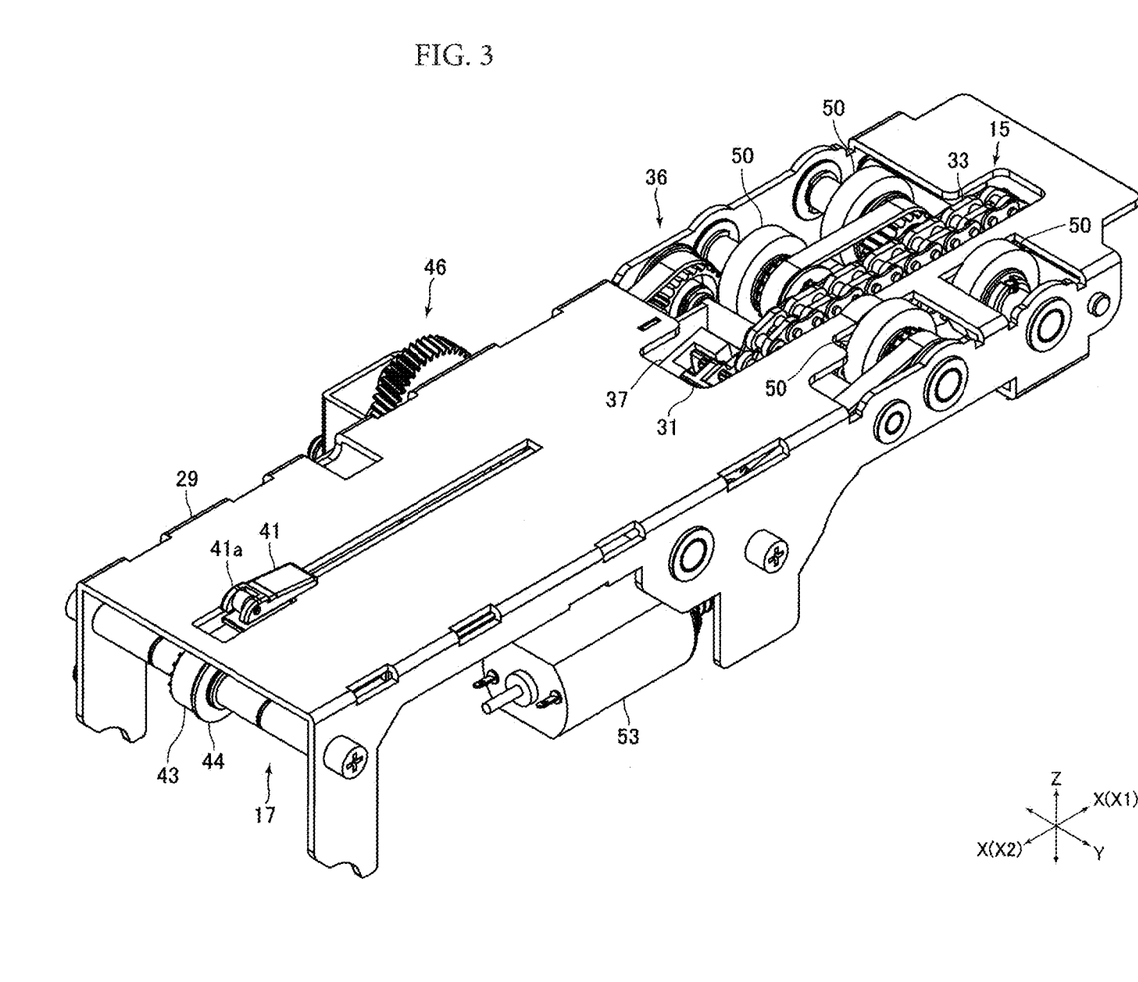
FIG. 3 is a perspective view for explaining the configurations of card transmitting mechanisms, a card conveying mechanism, etc., illustrated in FIG. 2.
Figure 4:
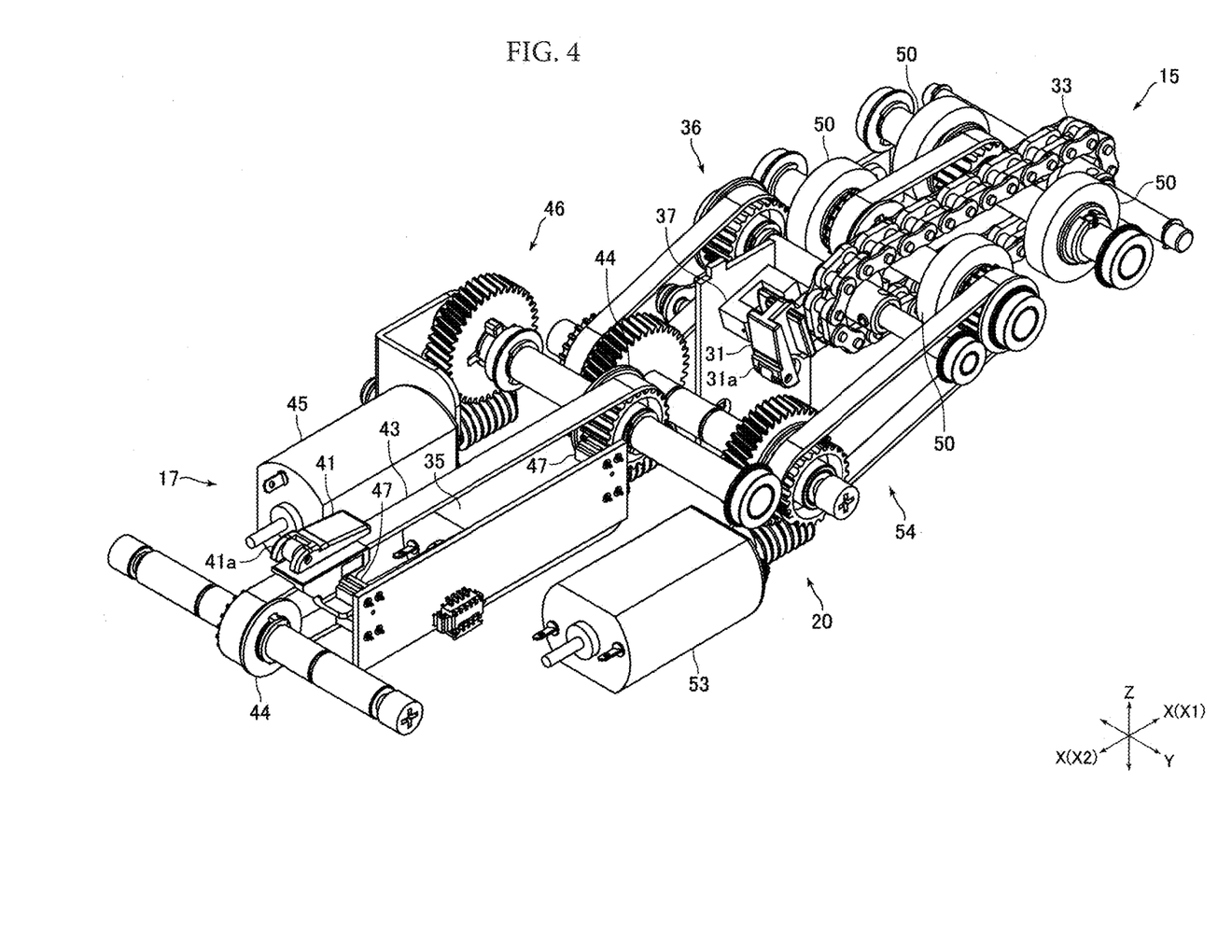
FIG. 4 is a perspective view in a state where a frame illustrated in FIG. 3 is removed.
Figure 5:
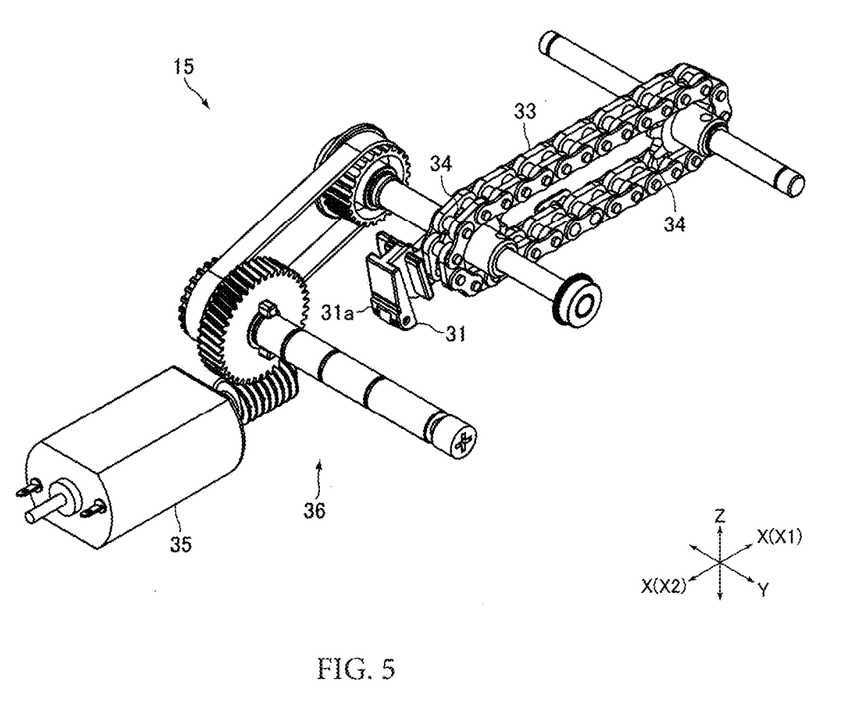
FIG. 5 is a perspective view of the card transmitting mechanism of the first card feeding mechanism illustrated in FIG. 4.
Figure 6:
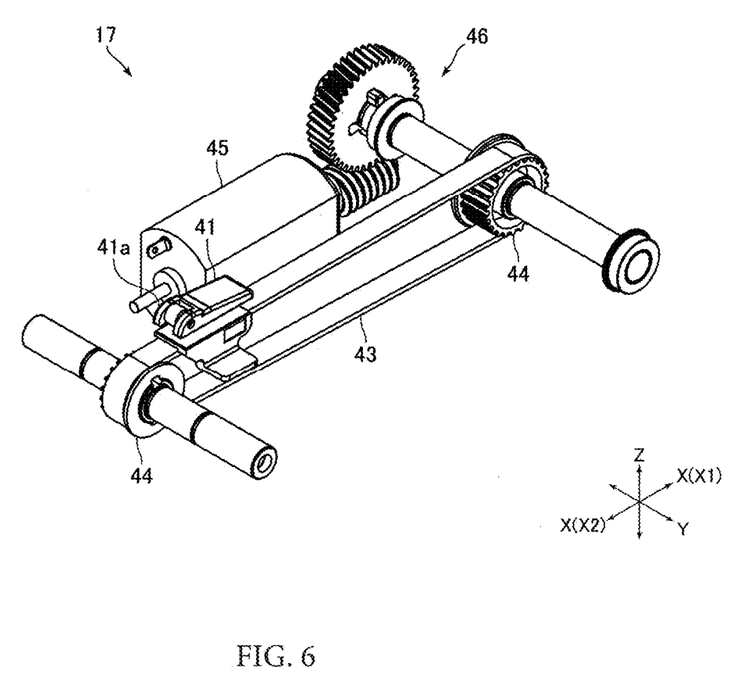
FIG. 6 is a perspective view of the card transmitting mechanism of the second card feeding mechanism illustrated in FIG. 4.
Figure 7:
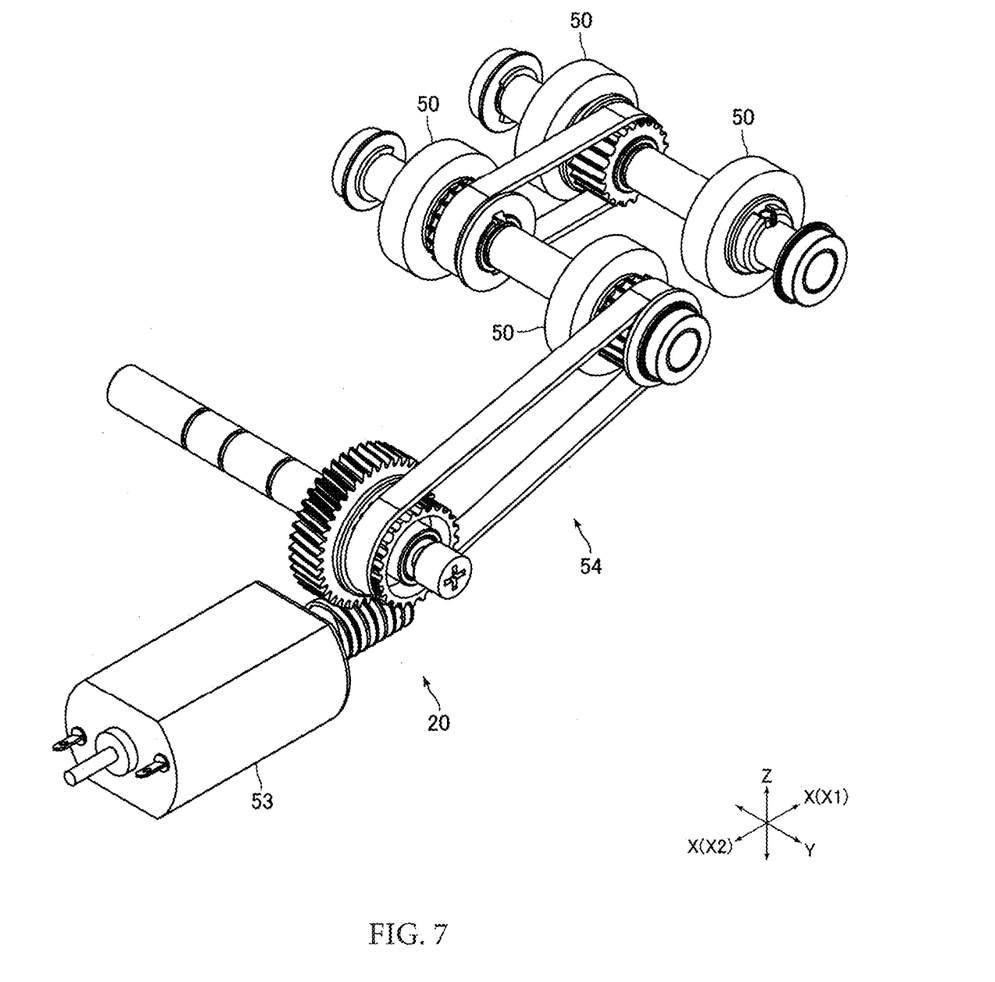
FIG. 7 is a perspective view of a part of the card conveying mechanism and a driving mechanism illustrated in FIG. 4.

FIG. 2 is a side view for explaining the configurations of the card feeding mechanisms 3 and 4 illustrated in FIG. 1. FIG. 3 is a perspective view for explaining the configurations of card transmitting mechanisms 15 and 17, a card conveying mechanism 19, etc., which are illustrated in FIG. 2. FIG. 4 is a perspective view of a state in which a frame 29 as illustrated in FIG. 3 is removed. FIG. 5 is a perspective view of the card transmitting mechanism 15 illustrated in FIG. 4. FIG. 6 is a perspective view of the card transmitting mechanism 17 illustrated in FIG. 4. FIG. 7 is a perspective view of a part of the card conveying mechanism 19 and a driving mechanism 20, which are illustrated in FIG. 4.

The card feeding mechanism 3 includes: a card accommodating unit 14 in which multiple cards 2 are stacked and accommodated; and a card transmitting mechanism 15 configured to transmit, to the outside of the card accommodating unit 14, the card 2 at the very bottom of the multiple cards 2 accommodated in the card accommodating unit 14. As with the card feeding mechanism 3, the card feeding mechanism 4 includes: a card accommodating unit 16 in which multiple cards 2 are stacked and accommodated; and a card transmitting mechanism 17 configured to transmit, to the outside of the card accommodating unit 16, the card 2 at the very bottom of the multiple cards 2 accommodated in the card accommodating unit 16. Each of the card transmitting mechanisms 15 and 17 transmit the card 2 toward the front.

In the card feeding mechanism 3, there is formed a card conveying path 18 through which a card 2 transmitted from the card feeding mechanism 4 is conveyed. The card conveying path 18 is disposed below the card 2 at the very bottom, which is accommodated in the card accommodating unit 14. The card feeding mechanism 3 includes: a card conveying mechanism 19 configured to convey a card 2 through the card conveying path 18; and a driving mechanism 20 configured to drive the card conveying mechanism 19. The card conveying mechanism 19 is positioned in the card conveying path 18.

The card accommodating unit 14 includes: a card cartridge 23 in which multiple cards 2 are stacked and accommodated; and an accommodating unit main body 24 to which the card cartridge 23 is attached in a detachable manner. As with the card accommodating unit 14, the card accommodating unit 16 includes: a card cartridge 25 in which multiple cards 2 are stacked and accommodated; and an accommodating unit main body 26 to which the card cartridge 25 is attached in a detachable manner. The accommodating unit main body 24 includes a frame 28 on which the card cartridge 23 is provided. The accommodating unit main body 26 includes a frame 29 on which the card cartridge 25 is provided. The front edge portion of the frame 29 continues to the front of the front surface of the card cartridge 25. Further, the frame 28 is provided on the front edge portion of the frame 29. That is to say, the front edge portion of the frame 29 is provide below the frame 28.

The card conveying path 18 is formed by the frame 28. Furthermore, the card conveying path 18 is positioned below the card conveying path of the card reader 5. At the front edge upper surface of the card conveying path 18, there is positioned a plate spring 30 configured to guide a card 2 to the card reader 5, which is positioned in the front of the card conveying path 18 (i.e., specifically, configured to guide a card 2 to the card conveying path of the card reader 5). The plate spring 30 is fixed to the front edge of the frame 28. The front edge portion of the bottom surface of the card cartridge 23 is in contact with the front edge portion of the top surface of the plate spring 30. The front edge of the bottom surface of the card conveying path 18 is a sloping surface sloping upward to the front.

The card cartridge 23 and the card cartridge 25 are formed in the same shape. The card cartridges 23 and 25 are formed in a shape of a rectangular box. The bottom surface of the card cartridge 23 has a through-groove through which a below-described transmitting claw 31, which constitutes a part of the card transmitting mechanism 15, travels. The through-groove is formed in a shape of a slit that is thin and long in the front-and-back direction. The bottom surface of the card cartridge 25 has a through-groove through which a below-described transmitting claw 41, which constitutes a part of the card transmitting mechanism 17, passes. The through-groove is formed in a shape of a slit that is thin and long in the front-and-back direction. Note that the frame 29 has an opening through which the transmitting claw 31 travels (c.f., FIG. 3). Further, the frame 28 has a through-groove, through which the transmitting claw 31 travels, in a shape of a slit that is thin and long in the front-and-back direction. Furthermore, the frame 29 has a through-groove, through which the transmitting claw 41 travels, in a shape of a slit that is thin and long in the front-and-back direction (c.f., FIG. 3).

At the bottom corner of the front surface of the card cartridge 23, there is formed a gate 23a through which a card 2 transmitted by the card transmitting mechanism 15 passes. Further, at the bottom corner of the front surface of the card cartridge 25, there is formed a gate 25a through which a card 2 transmitted by the card transmitting mechanism 17 passes. The interspace between the gates 23a and 25a in the up-and-down direction is set such that a single card 2 is able to pass through the but two stacked cards 2 are not able to pass through.

As described above, the frame 28, on which the card cartridge 23 is provided, is provided on the front edge portion of the frame 29, on which the card cartridge 25 is provided. Therefore, the gate 25a is positioned below the gate 23a. Furthermore, the gate 25a is positioned at the same level in the up-and-down direction as the rear edge of the card conveying path 18. The card 2 transmitted by the card feeding mechanism 4 is fed to the card conveying path 18. Note that the gate 23a is positioned at the same level in the up-and-down direction as the card conveying path of the card reader 5.

The card transmitting mechanism 15 includes the transmitting claw 31 configured to engage with the card 2 at the very bottom of the multiple cards 2 accommodated in the card accommodating unit 14 to transmit the card 2 to the outside of the card accommodating unit 14. On the transmitting claw 31, there is formed a card engaging part 31a that engages with the rear edge of the card 2. Furthermore, the card transmitting mechanism 15 includes: an annular chain 33 to which the transmitting claw 31 is fixed; two sprockets 34 around which the chain 33 is installed; a motor 35; and a power transmission mechanism 36 configured to transmit power from the motor 35 to one of the sprockets 34. The power transmission mechanism 36 is configured with gears, pulleys, a belt, etc.

The axis direction of rotation of each of the sprockets 34 is the right-and-left direction. The two sprockets 34 are positioned to have an interspace in the front-and-back direction. The two sprockets 34 and the chain 33 are positioned below the card conveying path 18. When the transmitting claw 31 moves between the two sprockets 34 toward the front, the card engaging part 31a travels above the top surface of the bottom of the card cartridge 23 and transmits the card 2 to the front. That is to say, here, the card engaging part 31a travels above the card conveying path 18.

Contrarily, when the transmitting claw 31 moves between the two sprockets 34 toward the back, the transmitting claw 31 travels below the card conveying path 18. Specifically, the entire transmitting claw 31 travels below the card conveying path 18. That is to say, in the card transmitting mechanism 15, the portion of the chain 33 where the transmitting claw 31 is fixed moves toward the front between the top ends of the two sprockets 34 and moves toward the back between the bottom ends of the two sprockets 34. Furthermore, in the card transmitting mechanism 15, the transmitting claw 31 travels in the front of the sprocket 34 positioned in the front and travels in the back of the sprocket 34 positioned in the back.

When a card 2 fed by the card feeding mechanism 4 is conveyed through the card conveying path 18, the transmitting claw 31 is positioned at a stand-by position (i.e., the position illustrated in FIG. 2, etc.), where the transmitting claw 31 is positioned below the card conveying path 18 (i.e., more specifically, the entire transmitting claw 31 is positioned below the card conveying path 18). That is to say, the transmitting claw 31 is able to move to the stand-by position, where the transmitting claw 31 is positioned below the card conveying path 18. In the present embodiment, the transmitting claw 31 is positioned at the stand-by position when the transmitting claw 31 is positioned approximately in the back of the sprocket 34 positioned in the back. The card transmitting mechanism 15 includes a sensor 37 for detecting that the transmitting claw 31 is at the stand-by position (c.f., FIG. 3 and FIG. 4). The sensor 37 is a transmissive optical sensor including a light-emitting element and a light-receiving element.

The card transmitting mechanism 17 includes, as a second transmitting claw, the transmitting claw 41 configured to engage with the card 2 at the very bottom of the multiple cards 2 accommodated in the card accommodating unit 16 to transmit the card 2 to the outside of the card accommodating unit 16. On the transmitting claw 41, there is formed a card engaging part 41a that engages with the rear edge of the card 2. Furthermore, the card transmitting mechanism 17 includes: an annular belt 43 to which the transmitting claw 41 is fixed; two pulleys 44 around which the belt 43 is installed; a motor 45; and a power transmission mechanism 46 configured to transmit power from the motor 45 to one of the pulleys 44. The power transmission mechanism 46 is configured with gears, etc.

The axis direction of rotation of each of the pulleys 44 is the right-and-left direction. The two pulleys 44 are arranged to have an interspace in the front-and-back direction. The two pulleys 44 and the belt 43 are positioned below the bottom of the card cartridge 25. When the transmitting claw 41 moves between the two pulleys 44 toward the front, the card engaging part 41a travels above the top surface of the bottom of the card cartridge 25 to transmit the card 2 to the front.

Furthermore, when the transmitting claw 41 moves between the two pulleys 44 toward the back, the transmitting claw 41 travels the same level as the time when the transmitting claw 41 travels toward the front as well. In other words, the portion of the belt 43 where the transmitting claw 41 is fixed travels back and forth between the top ends of the two pulleys 44. The card transmitting mechanism 17 includes a sensor 47 for the transmitting claw 41 to detect the position of the transmitting claw 41 (c.f., FIG. 4). The sensor 47 is a transmissive optical sensor including a light-emitting element and a light-receiving element.

The card conveying mechanism 19 includes drive rollers 50 and pad rollers 51. The card conveying mechanism 19 in the present embodiment includes four drive rollers 50 and four pad rollers 51. Each of the drive rollers 50 is a rubber roller whose outer circumferential surface is formed of a rubber material. Each of the pad rollers 51 is formed of a resin material. The axis direction of rotation of each of the drive rollers 50 and the pad rollers 51 is the right-and-left direction. The four drive rollers 50 are arranged so as to approach the card conveying path 18 from below. Furthermore, as illustrated in FIG. 3 and FIG. 4, two drive rollers 50, which are positioned so as to have the chain 33 therebetween in the right-and-left direction, and the other two drive rollers 50, which are positioned so as to have the chain 33 therebetween in the right-and-left direction, are arranged so as to have an interspace in the front-and-back direction.

The two front drive rollers 50 are positioned slightly above the two rear drive rollers 50. The pad rollers 51 face the drive rollers 50 from above. Furthermore, the pad rollers 51 are biased toward the drive rollers 50. The driving mechanism 20 includes: a motor 53; and a power transmission mechanism 54 configured to transmit power from the motor 53 to the drive rollers 50. The power transmission mechanism 54 is configured with gears, pulleys, belts, etc.

(Operation of the Card Feeding Mechanism)

Figure 8:
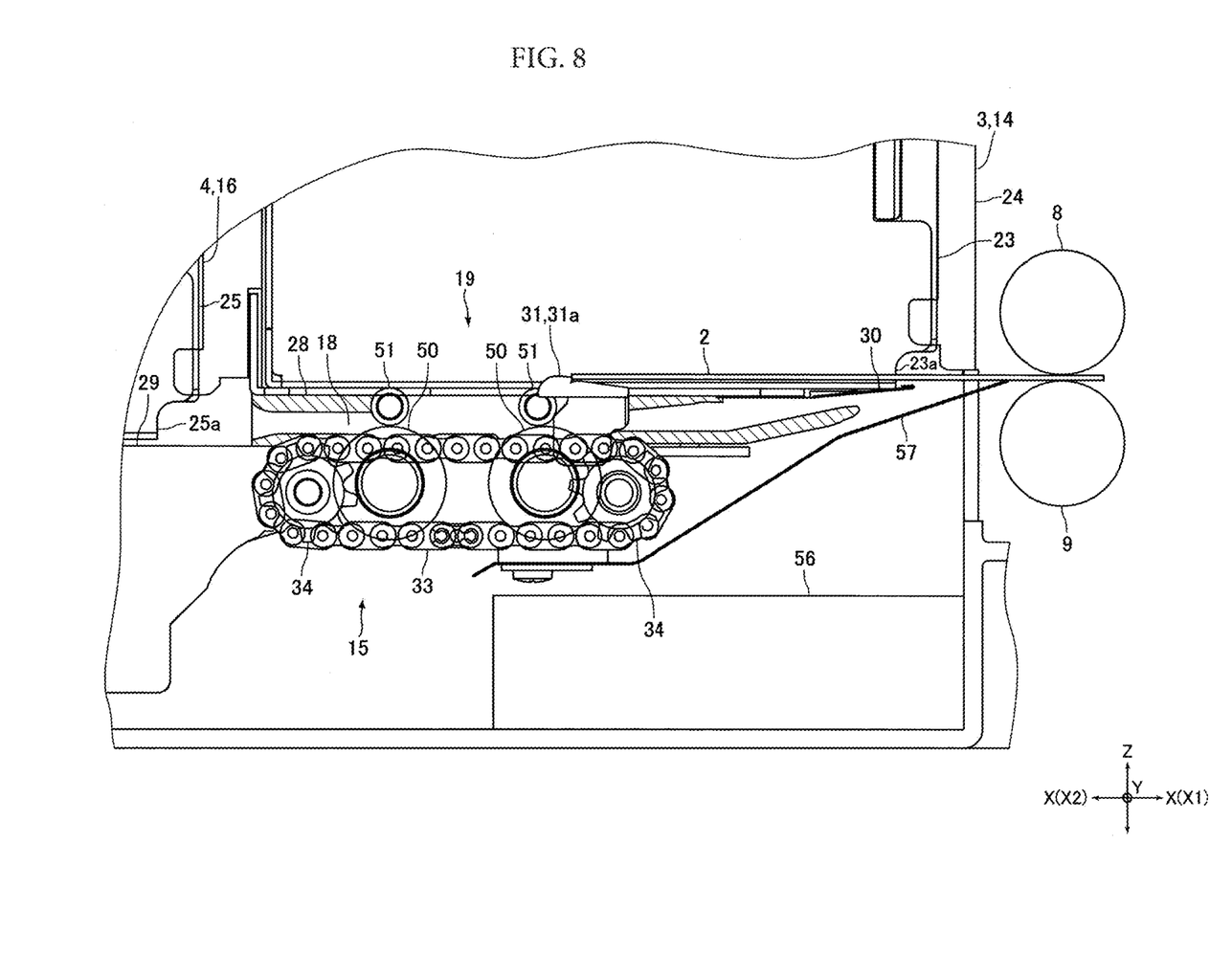
FIG. 8 is a diagram for explaining an operation to feed a card from the first card feeding mechanism illustrated in FIG. 2.
Figure 9:
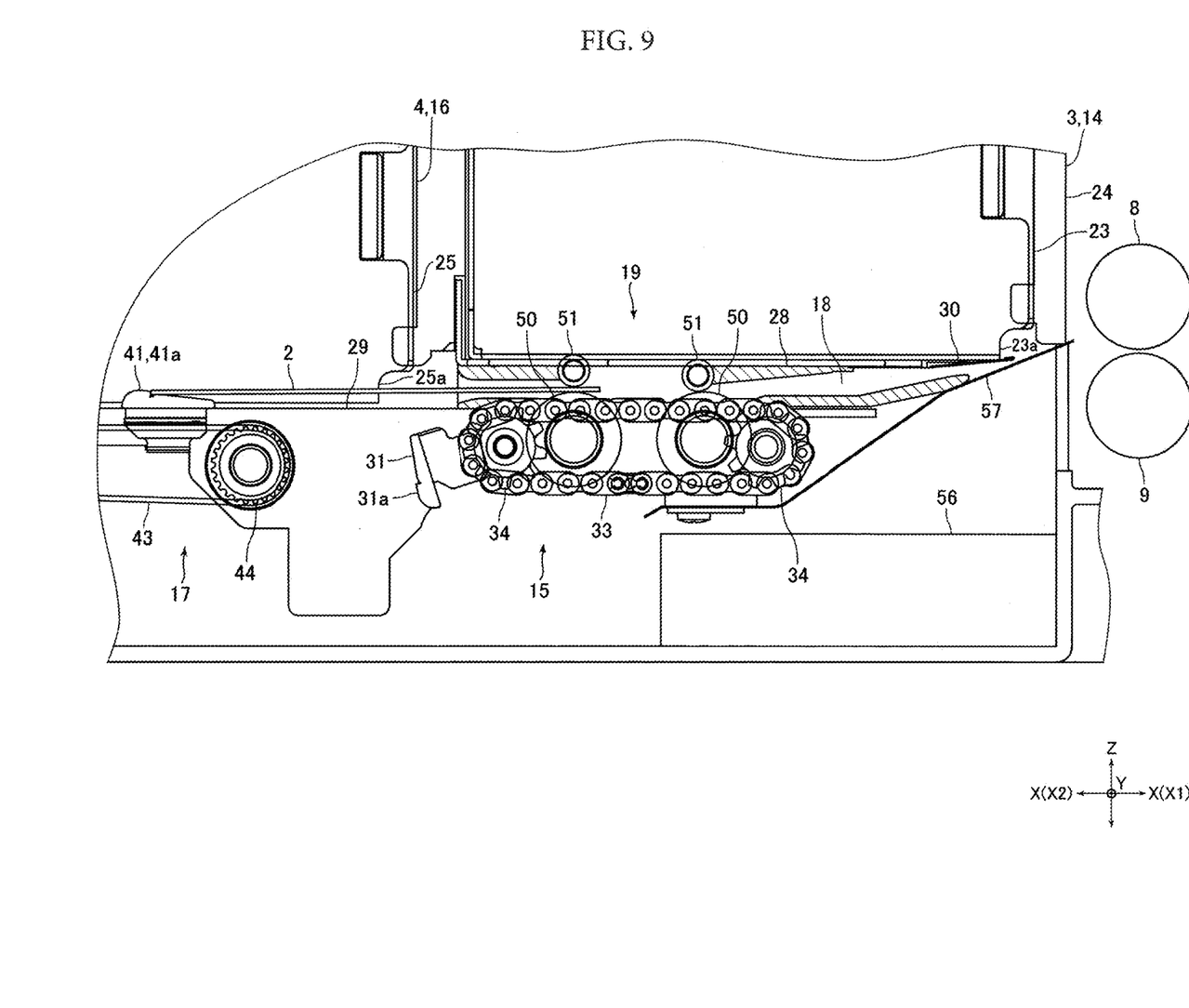
FIG. 9 is a diagram for explaining an operation to feed a card from the second card feeding mechanism illustrated in FIG. 2.
Figure 10:
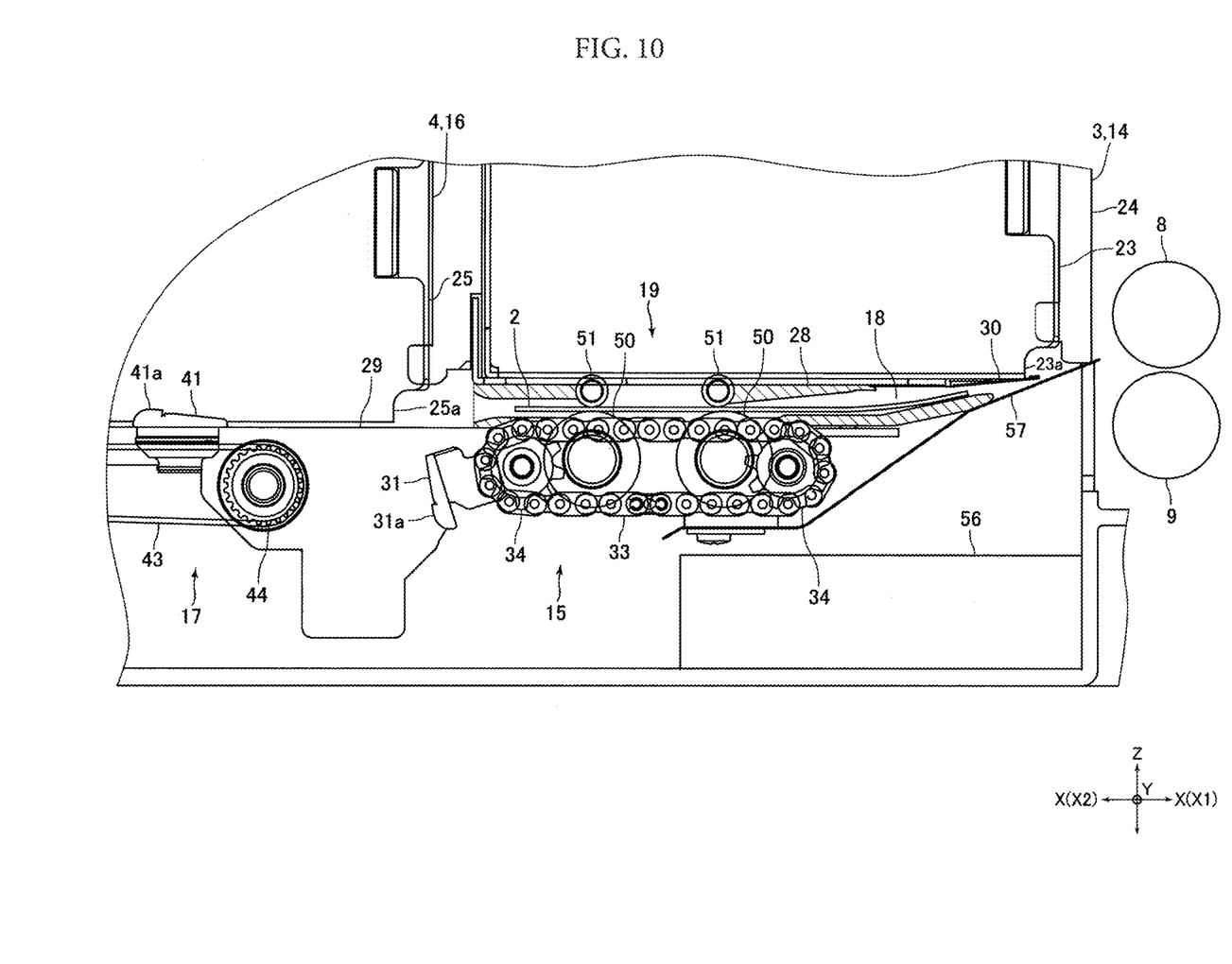
FIG. 10 is a diagram for explaining an operation to feed a card from the second card feeding mechanism illustrated in FIG. 2.
Figure 11:
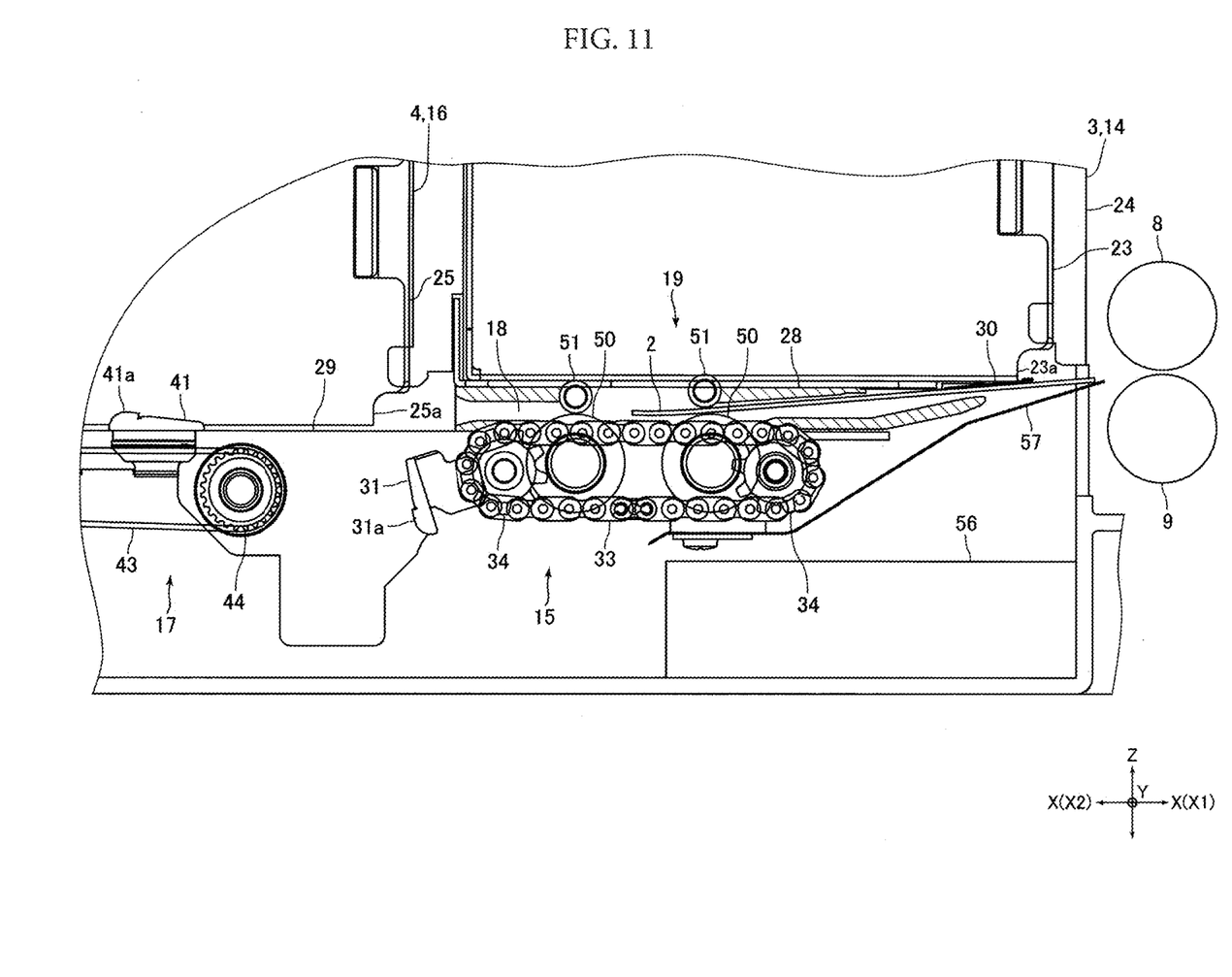
FIG. 11 is a diagram for explaining an operation to feed a card from the second card feeding mechanism illustrated in FIG. 2.

FIG. 8 is a diagram for explaining an operation to feed a card 2 from the card feeding mechanism 3 illustrated in FIG. 2. FIGS. 9 through 11 are diagrams for explaining an operation to feed a card 2 from the card feeding mechanism 4 illustrated in FIG. 2.

In the card issuing device 1, when a card 2 is fed from the card feeding mechanism 3 to the card reader 5, the transmitting claw 31, which is at the stand-by position, moves toward the front and, as illustrated in FIG. 8, engages with the card 2 positioned at the very bottom of the multiple cards 2 accommodated in the card accommodating unit 14 to transmit the card 2 to the front. After travelling through the gate 23a, the front edge of the card 2 transmitted to the front reaches the interspace between the drive roller 8 and the pad roller 9 and is nipped between the drive roller 8 and the pad roller 9. When the front edge of the card 2 is nipped between the drive roller 8 and the pad roller 9, the card 2 is subsequently conveyed by the drive roller 8 and the pad roller 9 and is brought in the card reader 5.

Contrarily, when a card 2 is fed from the card feeding mechanism 4 to the card reader 5, the transmitting claw 41 moves toward the front and engages with the card positioned at the very bottom of the multiple cards 2 accommodated in the card accommodating unit 16 to transmit the card to the front, as illustrated in FIG. 9. After travelling through the gate 25a, the front edge of the card 2 transmitted to the front is nipped between the drive rollers 50 and the pad rollers 51, which are positioned in the back. When the front edge of the card 2 is nipped between the drive rollers 50 and the pad rollers 51, which are positioned in the back, the card 2 is transmitted by the card conveying mechanism 19 to the front (c.f., FIG. 10 and FIG. 11).

When the front edge of the card 2 conveyed by the card conveying mechanism 19 reaches the interspace between the drive roller 8 and the pad roller 9 and is nipped between the drive roller 8 and the pad roller 9, the card 2 is subsequently transmitted by the drive roller 8 and the pad roller 9 and is brought in the card reader 5. The top surface of the card 2 transmitted by the card conveying mechanism 19 is guided by the plate spring 30 to the interspace of the drive roller 8 and the pad roller 9.

Note that, below the front edge portion of the card conveying path 18, there is disposed a card collecting chamber 56 for collecting cards 2. Further, to the frame 29, there is attached a plate spring 57 configured to guide a card 2 conveyed backward by the drive roller 8 and the pad roller 9 to the card collecting chamber 56. The plate spring 57 has a function for guiding the bottom surface of a card 2 transmitted by the card transmitting mechanism 15 and the bottom surface of a card 2 conveyed by the card conveying mechanism 19 to the interspace of the drive roller 8 and the pad roller 9.

(Main Effects of the Present Embodiment)

As explained above, in the present embodiment, the card feeding mechanisms 3 and 4 includes card transmitting mechanisms 15 and 17 configured to transmit a card 2 to the outside of the card accommodating units 14 and 16, respectively. Furthermore, in the card feeding mechanism 3 of the present embodiment, there is formed a card conveying path 18 through which a card 2 transmitted from the card feeding mechanism 4 is conveyed. The card conveying path 18 is positioned below the card 2 at the very bottom accommodated in the card accommodating unit 14. Furthermore, in the present embodiment, the card conveying mechanism 19 is arranged for the card conveying path 18. Therefore, in the present embodiment, there is no need for providing such a large-scale mechanism for lifting and dropping the card cartridge 23 as the card issuing device disclosed in Specification of Chinese Examined Utility Model Application Publication No. 04759457, as described above. Therefore, according to the present embodiment, it is possible to downsize the card issuing device 1.

Note that, as a single card 2 is conveyed through the card conveying path 18, the card conveying mechanism 19 cannot be a large-scale mechanism. Therefore, in the present embodiment, it is possible to downsize the card issuing device 1 even though the card conveying mechanism 19 is arranged for the card conveying path 18. Furthermore, as there is no need for lifting and dropping the card cartridge 23 in the present embodiment, such a problem that the lifted card cartridge 23 is not dropped to a predetermined position does not occur.

In the present embodiment, the gate 25a of the card cartridge 25 is positioned below the gate 23a of the card cartridge 23. Therefore, in the present embodiment, it is possible to transmit a card 2 from the card accommodating unit 16 toward the card conveying path 18 without greatly deforming the card 2 transmitted from the card accommodating unit 16 of the card feeding mechanism 4. Particularly, in the present embodiment, as the gate 25a is positioned at the same level in the up-and-down direction as the rear edge of the card conveying path 18, it is possible to transmit the card 2 from the card accommodating unit 16 toward the card conveying path 18 without deforming the card 2 transmitted from the card accommodating unit 16. Therefore, in the present embodiment, it is possible to prevent an issued card 2 from being deformed.

In the present embodiment, when a card 2 fed from the card feeding mechanism 4 is conveyed through the card conveying path 18, the transmitting claw 31 is positioned at the stand-by position, where the transmitting claw 31 is positioned below the card conveying path 18. Therefore, in the present embodiment, even though the distance between the card 2 at the very bottom accommodated in the card accommodating unit 14 and the card conveying path 18 in the up-and-down direction is narrowed, it is possible to prevent the card 2, which is conveyed through the card conveying path 18, and the transmitting claw 31 from interfering each other. Hence, in the present embodiment, it is possible to downsize the card feeding mechanism 3 in the up-and-down direction.

In the present embodiment, at the front edge upper surface of the card conveying path 18, there is disposed a plate spring 30 for guiding a card 2 to the card reader 5. In other words, in the present embodiment, at the front edge upper surface of the card conveying path 18, there is disposed a thin plate spring 30. Therefore, according to the present embodiment, it is possible to narrow the distance between the card cartridge 23 and the card conveying path 18 in the up-and-down direction, compared to a case where, for example, a guide made of a resin material is disposed at the front edge upper surface of the card conveying path 18. Hence, according to the present embodiment, it is possible to downsize the card feeding mechanism 3 in the up-and-down direction.

Furthermore, in a case where, for example, a guide made of a resin material is disposed at the front edge upper surface of the card conveying path 18 and the dimensional precision of the guide is low, there may be such a problem that the bottom surface of the card cartridge 23 comes into contact with the top surface of the guide and it is not possible to set the card cartridge 23 to a predetermined position. Contrarily, according to the present embodiment, as the plate spring 30 is disposed at the front edge upper surface of the card conveying path 18 and the bottom surface of the card cartridge 23 is in contact with the plate spring 30, it is possible to deform the plate spring 30, with which the bottom surface of the card cartridge 23 is in contact, so as to enable the card cartridge 23 to be surely set to a predetermined position.

Other Embodiments

The embodiment described above is one example of preferred embodiments of the present invention. Therefore, the present invention is not limited to the above example and various modified embodiments are possible without departing from the scope of the present invention.

In the embodiment described above, the gate 25a may be disposed at the same level as the gate 23a in the up-and-down direction or may be disposed above the gate 23a. Furthermore, in the embodiment described above, the card conveying path 18 may be arranged at the same level as the card conveying path of the card reader 5 in the up-and-down direction or may be arranged above the card conveying path of the card reader 5.

In the embodiment described above, in a case where the card conveying path 18 is disposed below the chain 33 and the sprockets 34, the transmitting claw 31 may move back and forth in the front-and-back direction between the top ends of the two sprockets 34. Furthermore, in a case where the card conveying path 18 is disposed below the chain 33 and the sprockets 34, the transmitting claw 31 may be fixed to the belt installed around the two pulleys or is moved back and forth in the front-and-back direction by use of a ball screw, etc.

In the embodiment described above, the card transmitting mechanism 17 may include, instead of the belt 43 and the pulleys 44, an annular chain to which the transmitting claw 41 is fixed and two sprockets around which the chain is installed. However, in a case where the card transmitting mechanism 17 includes the belt 43 and the pulleys 44, it is possible to reduce the cost for the card transmitting mechanism 17, compared to the case where the card transmitting mechanism 17 includes a chain and sprockets. Furthermore, in the embodiment described above, the transmitting claw 41 may be moved back and forth in the front-and-back direction by use of a ball screw, etc., instead of the belt 43 and the pulleys 44.

In the embodiment described above, the card conveying mechanism 19 may include, instead of the drive rollers 50 and pad rollers 51, a conveying claw configured to engage with the rear edge of a card 2 to convey the card 2. Furthermore, in the embodiment described above, the card accommodating units 14 and 16 are not required to include the card cartridges 23 and 25, respectively. That is to say, multiple cards 2 may be stacked and accommodated directly in the accommodating unit main bodies 24 and 26 of the card accommodating units 14 and 16. Furthermore, in the embodiment described above, a guide made of a resin material may be disposed at the front edge upper surface of the card conveying path 18, instead of the plate spring 30.

In the embodiment described above, the card issuing device 1 may include three or more card feeding mechanisms. For example, the card issuing device 1 may include three card feeding mechanisms. In this case, the card feeding mechanism positioned at the farthest front may have the same configuration as the above-described card feeding mechanism 3 and include the card accommodating unit 14 and the card transmitting mechanism 15. Furthermore, in the card feeding mechanism, there may be formed a card conveying path 18, for which the card conveying mechanism 19 is arranged.

Furthermore, the card feeding mechanism positioned at the farthest back may have the same configuration as the above-described card feeding mechanism 4 and include the card accommodating unit 16 and the card transmitting mechanism 17. Furthermore, the card feeding mechanism positioned in the middle in the front-and-back direction may have almost the same configuration as the above described card feeding mechanism 3 and include the card accommodating unit 14 and the card transmitting mechanism 15. Furthermore, in the card feeding mechanism, there is formed a card conveying path 18 for which the card conveying mechanism 19 is arranged. In the case where the card issuing device 1 includes three card feeding mechanisms, each of the card feeding mechanism positioned at the farthest front and the card feeding mechanism positioned in the middle in the front-and-back direction is a first card feeding mechanism.

In this case, the card 2 transmitted from the card feeding mechanism positioned in the back is conveyed through the card conveying path 18 of the card feeding mechanism positioned in the middle and then through the card conveying path 18 of the card feeding mechanism positioned in the front and is brought in the card reader 5. Furthermore, a card 2 transmitted from the card feeding mechanism positioned in the middle is conveyed through the card conveying path 18 of the card feeding mechanism disposed in the front and is brought in the card reader 5. Note that the driving mechanism for driving the card conveying mechanism 19 of the card feeding mechanism positioned in the front and the driving mechanism for driving the card conveying mechanism 19 of the card feeding mechanism positioned in the middle may be the same or may be separately provided.

Furthermore, in this case, for example, the gate 23a of the card feeding mechanism positioned in the middle is arranged above the gate 25a of the card feeding mechanism positioned in the back and below the gate 23a of the card feeding mechanism positioned in the front. Furthermore, in this case, the plate spring 30 of the card feeding mechanism positioned in the middle guides a card 2 to the card conveying path 18 of the card feeding mechanism in the front.

Furthermore, for example, in a case where the card issuing device 1 includes four card feeding mechanisms, the card feeding mechanism positioned in the farthest front may have the same configuration as the above-described card feeding mechanism 3. Further, the card feeding mechanism positioned the farthest back may have the same configuration as the above-described card feeding mechanism 4. Further, each of the two card feeding mechanisms positioned in the middle in the front-and-back direction may have almost the same configuration as the above-described card feeding mechanism 3.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card issuing device for issuing a card, the card issuing device comprising:
    a plurality of card feeding mechanisms, each of which comprises:
        a card accommodating unit in which a plurality of cards including the card are stacked and accommodated; and
        a card transmitting mechanism configured to transmit the card, which is positioned at the bottom of the plurality of cards accommodated in the card accommodating unit, to the outside of the card accommodating unit; and
    a card processing mechanism configured to process the card fed by one of the plurality of the card feeding mechanisms,
    wherein, in a case where a direction in which the card is issued from the card issuing device is forward in a front-and-back direction and the opposite direction is backward in the front-and-back direction, the plurality of card feeding mechanisms are aligned in the front-and-back direction,
    wherein the card processing mechanism is positioned in front of a card feeding mechanism positioned farthest to the front among the plurality of card feeding mechanisms,
    wherein the card transmitting mechanism is structured to transmit the card toward the front,
    wherein, in a case where each card feeding mechanism except for a card feeding mechanism positioned in the farthest back among the plurality of card feeding mechanisms is a first card feeding mechanism, a first card feeding mechanism comprises a card conveying path for conveying the card transmitted from a card feeding mechanism positioned behind the first card feeding mechanism,
    wherein the card conveying path is positioned below the card at the bottom accommodated in the card accommodating unit of the first card feeding mechanism, and
    wherein the card conveying path comprises a card conveying mechanism configured to convey the card through the card conveying path.

2. The card issuing device according to claim 1,
    wherein the card accommodating unit comprises a gate through which the card is transmitted by the card transmitting mechanism, and
    wherein the gate of a card feeding mechanism positioned behind an adjacent card feeding mechanism in the front-and-back direction is positioned below the gate of the adjacent card feeding mechanism positioned in the front.

3. The card issuing device according to claim 2,
    wherein a first card transmitting mechanism of the first card feeding mechanism comprises a transmitting claw configured to engage with the card to transmit the card, an annular chain to which the transmitting claw is fixed, and two sprockets around which the chain is installed, and
    wherein the transmitting claw is able to move to a stand-by position, at which the transmitting claw is positioned below the card conveying path.

4. The card issuing device according to claim 3,
    wherein the transmitting claw comprises a card engaging part that engages with a rear edge of the card,
    wherein, when the transmitting claw moves forward between the two sprockets, at least the card engaging part travels above the card conveying path,
    wherein, when the transmitting claw moves backward between the two sprockets, the card engaging unit travels below the card conveying path, and
    wherein, when the card is conveyed through the card conveying path, the transmitting claw is positioned at the stand-by position.

5. The card issuing device according to claim 4, wherein, in a case where the card feeding mechanism positioned at the farthest back among the plurality of card feeding mechanisms is a second card feeding mechanism, a second card transmitting mechanism of the second card feeding mechanism comprises a second transmitting claw configured to engage with the card to transmit the card, an annular belt to which the second transmitting claw is fixed, and two pulleys around which the belt is installed.

6. The card issuing device according to claim 4, wherein the card accommodating unit comprises a card cartridge in which the plurality of cards are stacked and accommodated and an accommodating unit main body to which the card cartridge is removably attached.

7. The card issuing device according to claim 6,
    wherein a plate spring is positioned at a front edge upper surface of the card conveying path, so as to guide the card toward the front to either one of the card conveying path of the first card feeding mechanism and the card processing mechanism, and
    wherein a front edge portion of a bottom surface of the card cartridge is in contact with a top surface of the plate spring.

8. The card issuing device according to claim 3, wherein, in a case where the card feeding mechanism positioned at the farthest back among the plurality of card feeding mechanisms is a second card feeding mechanism, a second card transmitting mechanism of the second card feeding mechanism comprises a second transmitting claw configured to engage with the card to transmit the card, an annular belt to which the second transmitting claw is fixed, and two pulleys around which the belt is installed.

9. The card issuing device according to claim 3, wherein the card accommodating unit comprises a card cartridge in which the plurality of cards are stacked and accommodated and an accommodating unit main body to which the card cartridge is removably attached.

10. The card issuing device according to claim 9,
wherein a plate spring is positioned at a front edge upper surface of the card conveying path, so as to guide the card toward the front to either one of the card conveying path of the first card feeding mechanism and the card processing mechanism, and
wherein a front edge portion of a bottom surface of the card cartridge is in contact with a top surface of the plate spring.

11. The card issuing device according to claim 2, wherein the card accommodating unit comprises a card cartridge in which the plurality of cards are stacked and accommodated and an accommodating unit main body to which the card cartridge is removably attached.

12. The card issuing device according to claim 11,
wherein a plate spring is positioned at a front edge upper surface of the card conveying path, so as to guide the card toward the front to either one of the card conveying path of the first card feeding mechanism and the card processing mechanism, and
wherein a front edge portion of a bottom surface of the card cartridge is in contact with a top surface of the plate spring.

13. The card issuing device according to claim 1,
wherein a first card transmitting mechanism of the first card feeding mechanism comprises a transmitting claw configured to engage with the card to transmit the card, an annular chain to which the transmitting claw is fixed, and two sprockets around which the chain is installed, and
wherein the transmitting claw is able to move to a stand-by position, at which the transmitting claw is positioned below the card conveying path.

14. The card issuing device according to claim 13,
wherein the transmitting claw comprises a card engaging part that engages with a rear edge of the card,
wherein, when the transmitting claw moves forward between the two sprockets, at least the card engaging part travels above the card conveying path,
wherein, when the transmitting claw moves backward between the two sprockets, the card engaging unit travels below the card conveying path, and
wherein, when the card is conveyed through the card conveying path, the transmitting claw is positioned at the stand-by position.

15. The card issuing device according to claim 14, wherein, in a case where the card feeding mechanism positioned at the farthest back among the plurality of card feeding mechanisms is a second card feeding mechanism, a second card transmitting mechanism of the second card feeding mechanism comprises a second transmitting claw configured to engage with the card to transmit the card, an annular belt to which the second transmitting claw is fixed, and two pulleys around which the belt is installed.

16. The card issuing device according to claim 14, wherein the card accommodating unit comprises a card cartridge in which the plurality of cards are stacked and accommodated and an accommodating unit main body to which the card cartridge is removably attached.

17. The card issuing device according to claim 16,
wherein a plate spring is positioned at a front edge upper surface of the card conveying path, so as to guide the card toward the front to either one of the card conveying path of the first card feeding mechanism and the card processing mechanism, and
wherein a front edge portion of a bottom surface of the card cartridge is in contact with a top surface of the plate spring.

18. The card issuing device according to claim 13, wherein, in a case where the card feeding mechanism positioned at the farthest back among the plurality of card feeding mechanisms is a second card feeding mechanism, a second card feeding mechanism of the second card feeding mechanism comprises a second transmitting claw configured to engage with the card to transmit the card, an annular belt to which the second transmitting claw is fixed, and two pulleys around which the belt is installed.

19. The card issuing device according to claim 13, wherein the card accommodating unit comprises a card cartridge in which the plurality of cards are stacked and accommodated and an accommodating unit main body to which the card cartridge is removably attached.

20. The card issuing device according to claim 19,
wherein a plate spring is positioned at a front edge upper surface of the card conveying path, so as to guide the card toward the front to either one of the card conveying path of the first card feeding mechanism and the card processing mechanism, and
wherein a front edge portion of a bottom surface of the card cartridge is in contact with a top surface of the plate spring.

21. The card issuing device according to claim 1, wherein the card accommodating unit comprises a card cartridge in which the plurality of cards are stacked and accommodated and an accommodating unit main body to which the card cartridge is removably attached.

22. The card issuing device according to claim 21,
wherein a plate spring is positioned at a front edge upper surface of the card conveying path, so as to guide the card toward the front to either one of the card conveying path of the first card feeding mechanism and the card processing mechanism, and
wherein a front edge portion of a bottom surface of the card cartridge is in contact with a top surface of the plate spring.

* * * * *